(12) United States Patent
Berglund

(10) Patent No.: US 8,424,562 B2
(45) Date of Patent: Apr. 23, 2013

(54) CHECK VALVE

(75) Inventor: Jan Berglund, Sundbyberg (SE)

(73) Assignee: Aerocrine AB, Solna (SE)

( * ) Notice: Subject to any disclaimer, the term of this patent is extended or adjusted under 35 U.S.C. 154(b) by 217 days.

(21) Appl. No.: 12/831,993

(22) Filed: Jul. 7, 2010

(65) Prior Publication Data

US 2011/0005616 A1 Jan. 13, 2011

(30) Foreign Application Priority Data

Jul. 8, 2009 (SE) ..................................... 0900944

(51) Int. Cl.
*F16K 15/00* (2006.01)
(52) U.S. Cl.
USPC ..................... 137/512.15; 137/532; 137/852
(58) Field of Classification Search ............. 137/512.15, 137/512, 512.1, 512.3
See application file for complete search history.

(56) References Cited

U.S. PATENT DOCUMENTS

| | | | | |
|---|---|---|---|---|
| 691,652 | A | * | 1/1902 | Morrill ........................ 417/543 |
| 1,235,558 | A | * | 8/1917 | De Laval ................... 137/512.1 |
| 1,492,599 | A | * | 5/1924 | Hildebrand ................ 137/512.1 |
| 1,514,090 | A | * | 11/1924 | Lewis ........................... 137/513 |
| 1,621,498 | A | * | 3/1927 | Drager ......................... 137/852 |
| 1,664,648 | A | * | 4/1928 | Tyden .......................... 137/513 |
| 1,817,127 | A | * | 8/1931 | Crockett ...................... 137/513 |
| 1,913,027 | A | * | 6/1933 | Griffith ........................... 169/23 |
| 2,112,641 | A | * | 3/1938 | Wheaton .................... 137/512.1 |
| 2,688,979 | A | * | 9/1954 | Kendrick ................. 137/512.15 |

(Continued)

FOREIGN PATENT DOCUMENTS

| | | |
|---|---|---|
| CN | 1547496 | 11/2004 |
| CN | 1547650 | 11/2004 |
| CN | 1871469 | 11/2006 |

OTHER PUBLICATIONS

Office Action from corresponding Chinese Application No. 201080030618.2, mailed on Jan. 4, 2013.

*Primary Examiner* — John Rivell
*Assistant Examiner* — Umashankar Venkatesan
(74) *Attorney, Agent, or Firm* — Renner, Otto, Boisselle & Sklar, LLP

(57) ABSTRACT

A diaphragm device for a check valves is provided. The diaphragm device comprises a diaphragm, adapted to cover at least one orifice, and an operation device, adapted to enable movement of the diaphragm substantially along a length axis of the orifice. The operation device comprises at least one first operation organ and at least one second operation organ. The first and second operation organ in turn each comprises a first portion, and a second portion. The first portion of the first operation organ is adapted to be connected to a check valve housing, and the second portion of the first operation organ is connected to the second portion of the second operation organ. Furthermore the first portion of the second operation organ is connected to the diaphragm and the second portion of the second operation organ is connected to the second portion of the first operation organ. The first operation organ is movable in relation to the second operation organ, and the second operation organ is movable in relation to the diaphragm, for enabling movement of the diaphragm, substantially along the length axis of the orifice. This embodiment could enable the check valve to open a relatively long way by means of a relatively low pressure or flow, at the same time as the deformation of the resilient material could be relatively small since it is deformed in a multiplicity of points and along a relatively long extension of resilient material.

12 Claims, 8 Drawing Sheets

U.S. PATENT DOCUMENTS

| | | | | |
|---|---|---|---|---|
| 2,725,075 A * | 11/1955 | Irgens | | 137/512.1 |
| 2,827,921 A * | 3/1958 | Sherman et al. | | 137/527 |
| 3,059,666 A * | 10/1962 | Lodge | | 137/512 |
| 3,074,429 A * | 1/1963 | Farrow | | 137/527.8 |
| 3,081,730 A * | 3/1963 | Dvorachek | | 114/211 |
| 3,115,155 A * | 12/1963 | Clark | | 137/512.3 |
| 3,119,411 A * | 1/1964 | Bock et al. | | 137/855 |
| 3,295,547 A * | 1/1967 | Scaramucci | | 137/315.33 |
| 3,508,576 A * | 4/1970 | Gross | | 137/859 |
| 3,616,814 A * | 11/1971 | Hendey | | 73/197 |
| 3,788,071 A | 1/1974 | Brewer | | |
| 3,807,444 A * | 4/1974 | Fortune | | 137/512.1 |
| 3,831,627 A * | 8/1974 | Hanlon | | 137/512.1 |
| 3,862,281 A * | 1/1975 | Uchiyama | | 261/114.4 |
| 3,883,111 A * | 5/1975 | Jourdan | | 251/82 |
| 4,022,421 A * | 5/1977 | Carlin | | 251/74 |
| 4,067,356 A * | 1/1978 | Kreuz | | 137/527 |
| 4,305,424 A * | 12/1981 | Wankel | | 137/512.15 |
| 4,489,753 A * | 12/1984 | Frenkel | | 137/512.15 |
| 4,759,385 A * | 7/1988 | Hudson, Jr. | | 137/512.15 |
| 5,010,918 A * | 4/1991 | Tolsma | | 137/512.15 |
| 5,176,172 A * | 1/1993 | Ackroyd | | 137/527 |
| 5,222,516 A * | 6/1993 | Schrocker | | 137/340 |
| 5,947,152 A * | 9/1999 | Martin et al. | | 137/527.2 |
| 6,016,833 A * | 1/2000 | Spurny et al. | | 137/512.1 |
| 6,237,625 B1 * | 5/2001 | Randolph | | 137/512.15 |
| 6,394,137 B1 * | 5/2002 | Kikuchi et al. | | 137/859 |
| 6,748,979 B2 * | 6/2004 | Miyazawa et al. | | 137/859 |
| 6,767,193 B2 * | 7/2004 | Hirose et al. | | 417/269 |
| 6,942,472 B2 * | 9/2005 | Sieberg | | 417/441 |
| 6,983,924 B2 | 1/2006 | Howell et al. | | |
| 7,331,360 B2 * | 2/2008 | Camis, Jr. | | 137/512.3 |
| 7,673,695 B2 * | 3/2010 | Deurloo | | 169/17 |
| 7,740,023 B2 * | 6/2010 | Zweber | | 137/1 |
| 2005/0081921 A1 * | 4/2005 | Blake et al. | | 137/512.15 |
| 2005/0098215 A1 * | 5/2005 | Call et al. | | 137/512.15 |
| 2006/0275166 A1 * | 12/2006 | Mattioli et al. | | 417/571 |
| 2008/0011373 A1 * | 1/2008 | Zelson | | 137/859 |

* cited by examiner

CHECK VALVE

CROSS REFERENCE TO RELATED APPLICATIONS

This application claims priority to Swedish Patent Application Serial No. SE 0900944-0, filed on Jul. 8, 2009, which is hereby incorporated by reference in its entirely.

FIELD OF INVENTION

The present invention relates generally to check valves, and particularly to diaphragm check valves.

BACKGROUND

A check valves is a passive valve that is opened when subject to a flow in a first direction and closed when subject to a flow in a second direction, most commonly the first and second directions are opposite. Check valves can be used to control the flow of any kind of fluid, gaseous or liquid, or a fluid containing solid particles such as slurry.

Previously known check valves comprises a diaphragm adapted to seal against a valve seat when a pressure is exerted on the diaphragm. The diaphragm is usually mounted to a valve housing either with a centrally places fixation device or using a movable joint fixated to a peripheral portion of the diaphragm. Embodiments in which the diaphragm is fixated with a centrally placed fixation device has disadvantages in that the centrally placed fixation device needs to be attached to the valve housing, and therefore some kind of attachment are usually blocking the flow. Furthermore, centrally fixated diaphragms needs to perform a funnel deformation, which requires a greater force than a linear deformation, and the valve never opens fully even if the diaphragm is deformed into a steep funnel, i.e. a funnel having a small angle between the center axis of the funnel and the funnel wall. Embodiments in which the diaphragm is fixated to a peripheral portion has the disadvantage that they require a large space to open fully since the entire diaphragm needs to be positioned in the direction of the flow, furthermore this 90° opening places large strain on the joint, especially if the joint functions by means of resilient material.

SUMMARY

A diaphragm device for a check valves is provided. The diaphragm device comprises a diaphragm, adapted to cover at least one orifice, and an operation device, adapted to enable movement of the diaphragm substantially along a length axis of the orifice. The operation device comprises at least one first operation organ and at least one second operation organ. The first and second operation organ in turn each comprises a first portion, and a second portion. The first portion of the first operation organ is adapted to be connected to a check valve housing, and the second portion of the first operation organ is connected to the second portion of the second operation organ. Furthermore the first portion of the second operation organ is connected to the diaphragm and the second portion of the second operation organ is connected to the second portion of the first operation organ. The first operation organ is movable in relation to the second operation organ, and the second operation organ is movable in relation to the diaphragm, for enabling movement of the diaphragm, substantially along the length axis of the orifice. This embodiment could enable the check valve to open a relatively long way by means of a relatively low pressure or flow, at the same time as the deformation of the resilient material could be relatively small, since it is deformed in a multiplicity of points and along a relatively long extension of resilient material.

According to one embodiment, the first portion is a central portion, placed in proximity to an orifice center axis, and the second portion is a peripheral portion, placed further away from the orifice center axis than the first central portion.

According to another embodiment the diaphragm device further comprises a second operation device. A second operation device could create a more stable construction. It is furthermore conceivable that the diaphragm device further comprises at least a third diaphragm adapted to cover a third orifice.

According to yet another embodiment the diaphragm device further comprises a second diaphragm adapted to cover a second orifice. Having a multiplicity of smaller orifices could enable the valve to seal by means of a lower pressure while still providing openings adapted for a relatively large flow.

According to one embodiment the diaphragm device comprises the operation device, which for example could be enabled through the diaphragm device and the operation device being materially connected and/or made from the same work piece.

The operation device according to any of the embodiments herein could enable movement of the diaphragm by the operation device comprising the resilient material. According to another embodiment the diaphragm also comprises resilient material, which could be the same or a different resilient material. The resilient material could be a resilient polymer material.

The diaphragm device according to any of the embodiments herein could further comprise a fixating section adapted to fixate the diaphragm device to the check valve housing. The fixating section could be materially connected to the diaphragm device, and could be made from the same work piece.

A check valve is further provided, the check valve comprises a diaphragm device comprising a diaphragm, adapted to cover at least one orifice. The diaphragm device comprises an operation device adapted to enable movement of the diaphragm, substantially along a length axis of the orifice. The operation device comprises at least one first operation organ, and at least one second operation organ. The first and second operation organs each comprises a first portion, and a second portion. The first portion of the first operation organ is adapted to be connected to a check valve housing, and the second portion of the first operation organ is connected to the second portion of the second operation organ. The first portion of the second operation organ is connected to the diaphragm, and the second portion of the second operation organ is connected to the second portion of the first operation organ. The first operation organ is movable in relation to the second operation organ and the second operation organ is movable in relation to the diaphragm, for enabling movement of the diaphragm substantially along the length axis of the orifice. The check valve further comprises: a valve seat surrounding the orifice, the diaphragm is adapted to seal against the valve seat, while covering the orifice, and a check valve housing comprising the valve seat.

Furthermore a check valve system is provided, the check valve system comprises a flow channel, a first check valve according to any of the embodiments herein, and a second check valve according to any of the embodiments herein. The first check valve is adapted to be opened during flow in the flow channel in a first direction, and the first check valve is adapted to be closed during flow in the flow channel in a second direction. The second check valve is adapted to be opened during flow in the flow channel in a second direction, and the second check valve is adapted to be closed during flow in the flow channel in a first direction.

According to one embodiment of the check valve system, the second flow is a flow in a substantially opposite direction than said the flow. The flow channel according to any of the embodiments could comprise the valve housing.

Please note that any embodiment or feature of an embodiment could be combined in any way if such combination is not clearly contradictory.

BRIEF DESCRIPTION OF DRAWINGS

The embodiments are now described, by way of example, with reference to the accompanying drawings, in which.

DETAILED DESCRIPTION

The invention will now be described in more detail in respect of preferred embodiments and in reference to the accompanying drawings. All examples herein should be seen as part of the general description and therefore possible to combine in any way in general terms. Again, individual features of the various embodiments may be combined or exchanged unless such combination or exchange is clearly contradictory to the overall function of the device.

The check valve described herein could be adapted for a flow of a fluid, such as air or any other gaseous fluid, or water, or any other liquid fluid, or a fluid containing solid particles such as slurry. The components dimensions and material could be adapted for the particular use.

In one specific embodiment the check valve is adapted to be used in a medical apparatus for determining the content of exhale gasses. In this specific embodiment the check valve, or parts of the check valve is made from a material suitable for medical applications such as silicone, and the dimensions of the check valve are adapted to provide suitable resistance for the receiving exhale gases.

Resilience is to be understood as a materials ability to deform under applied strain. Elasticity/flexibility is to be understood as a materials ability to deform in an elastic way. Elastic deformation is when a material deforms under stress (e.g. external forces), but returns to its original shape when the stress is removed. A more elastic material is to be understood as a material having a lower modulus of elasticity or Young's modulus. The elastic modulus of an object is defined as the slope of its stress-strain curve in the elastic deformation region. The elastic modulus is calculated as stress/strain, where stress is the force causing the deformation, divided by the area to which the force is applied; and strain is the ratio of the change caused by the stress. Stiffness is to be understood as the resistance of an elastic body to deformation by an applied force.

Operation organ is to be understood as part or section of material adapted for enabling movement of for example a diaphragm. According to some of the embodiments described herein the operation organ is an elongated part of resilient material which could comprise portions which are adapted to enable movement in relation to other parts or sections in connection with the operation organ. It is however also conceivable that the operating organ is a substantially stiff part or section with portions enabling movement in relation to other parts or sections by means of mechanical joints.

Figure 1A:
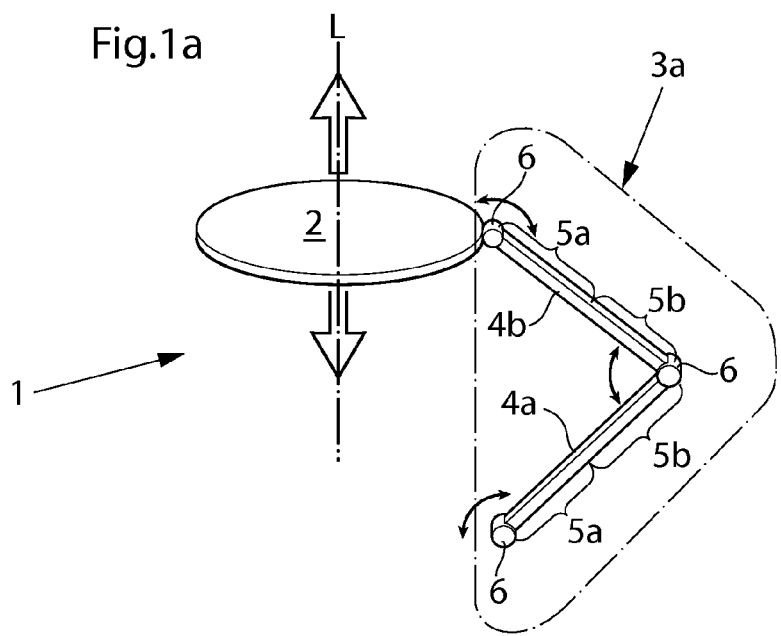
FIG. 1a shows a diaphragm device according to one embodiment, comprising one operation device.

FIG. 1a shows a diaphragm device 1 for a check valve according to one embodiment. The diaphragm device 1 comprises a diaphragm 2 adapted to cover an orifice. The orifice is preferably adapted for a flow of a fluid, such as air or any other gaseous fluid, or water, or any other liquid fluid. The diaphragm device 1 comprises an operation device 3a adapted to enable movement of the diaphragm 2 substantially along a length axis of the orifice (shown in FIGS. 6 and 7). The operation device 3a comprises a first operation organ 4a and a second operation organ 4b, which according to the embodiment shown in FIG. 1a are substantially stiff shafts. The first operation organ 4a comprises a first portion 5b, being a central portion 5a, placed in proximity to an orifice center axis L. The orifice center axis L is an axis extending over the orifice 2 and analogous over the diaphragm, perpendicular to the orifice length axis shown in FIGS. 6 and 7. The first operation organ 4a further comprises a second portion 5b, being a peripheral portion 5b, placed further away from the orifice center axis L than the central portion 5a. The second operation organ 4b also comprises a first portion 5a, being a central portion, placed in proximity to the orifice center axis L, and a second portion, being a peripheral portion 5b, placed further away from the orifice center axis L than the first central portion 5a. According to the embodiment shown in FIG. 1a, the first portion 5a of the first operation organ 4a is adapted to be connected to a check valve housing (shown in FIGS. 6-10). The connection is according to the embodiment shown in FIG. 1a a movable connection which is movable by means of a joint 6 adapted to perform rotational movement, such as a hinge, around a joint axis. The second portion 5b of the first operation organ 4a is connected to the second portion 5b of the second operation organ 4b, this connection is also movable by means of a joint 6 adapted to perform rotational movement. Furthermore the first portion 5a of the second operation organ 4b is connected to the diaphragm 2, yet again by means of a movable joint, and the second portion 5b of the second operation organ 4b is in analogy connected to the second portion 5b of the first operation organ 4a. The first operation organ 4a is thereby movable in relation to the second operation organ 4b and the second operation organ 4b is movable in relation to the diaphragm 2. The operation organs 4a, 4b, being part of the operation device 3a, enables movement of the diaphragm 2, substantially along the length axis of the orifice (shown in FIGS. 6 and 7).

Figure 1B:
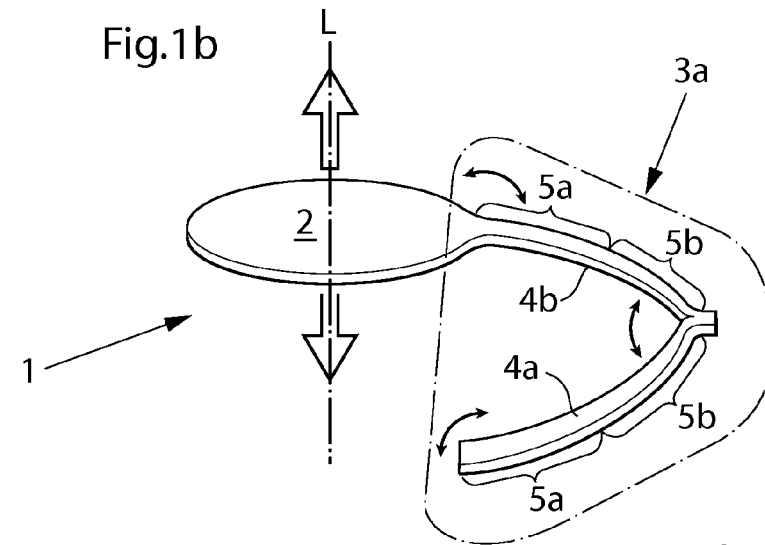
FIG. 1b shows a diaphragm device according to another embodiment, comprising one operation device.
Figure 1B:
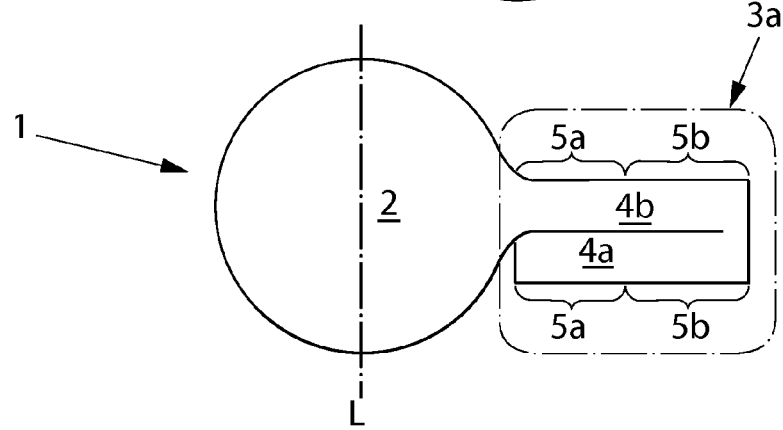

FIG. 1b shows a diaphragm device 1 for a check valve according to another embodiment. The diaphragm device 1 comprises a diaphragm 2 adapted to cover an orifice (shown in FIGS. 6-10). The orifice 7 is preferably adapted for a flow of a fluid, such as air or any other gaseous fluid, or water, or any other liquid fluid. The diaphragm device 1 comprises an operation device 3a adapted to enable movement of the diaphragm 2 substantially along a length axis of the orifice (shown in FIGS. 6 and 7). The operation device 3a comprises a first operation organ 4a and a second operation organ 4b, which according to the embodiment shown in FIG. 1b is a resilient shaft which could be elastic or flexible in any other way. The first operation organ 4a comprises a first portion 5a, being a central portion, placed in proximity to an orifice center axis L, and a second portion, being a peripheral portion 5b, placed further away from the orifice center axis L than the central portion 5a. The second operation organ 4b also comprises a first portion 5a, being a central portion, placed in proximity to an orifice center axis L, and a second portion, being a peripheral portion 5b, placed further away from the orifice center axis L than the first central portion 5a. According to the embodiment shown in FIG. 1b, the first portion 5a of the first operation organ 4a is adapted to be connected to a check valve housing (shown in FIGS. 6-10). The connection to the check valve housing could be achieved through a mechanical fastening element, an adhesive or the central portion 5a extending to a fixation section made from the same material, as described in further detail with reference to FIGS. 4-5. The second portion 5b of the first operation organ 4a is according to the embodiment of FIG. 1b connected to the second portion 5b of the second operation organ 4b. According to this embodiment the connection is achieved through that the first operation organ 4a and the second operation 4b is made from the same work piece and is thereby materially connected at a second portion of the operation organs 4a, b. The first portion 5a of the second operation organ 4b is connected to the diaphragm 2. According to the embodiment shown in FIG. 1b the connection is achieved through that the second operation organ 4b and the diaphragm 2 is made from the same work piece and thereby materially connected. The second portion 5b of the second operation organ 4b is in analogy connected to the second portion 5b of the first operation organ 4a. The first operation organ 4a is thereby movable in relation to the second operation organ 4b and the second operation organ 4b is movable in relation to the diaphragm 2. The operation organs 4a, 4b, being part of the operation device 3a, enables movement of the diaphragm 2, substantially along the length axis of the orifice (shown in FIGS. 6 and 7). In FIG. 1b, the diaphragm device is furthermore shown in from above comprising the previously described elements. The design as shown in FIG. 1b creates a long extension of resilient material in the operation organs 4a, 4b, which enables the check valve to open a relatively long way by means of a relatively low pressure or flow. At the same time the deformation of the resilient material is relatively small since it is deformed in a multiplicity of points and along a relatively long extension of resilient material.

Figure 2A:
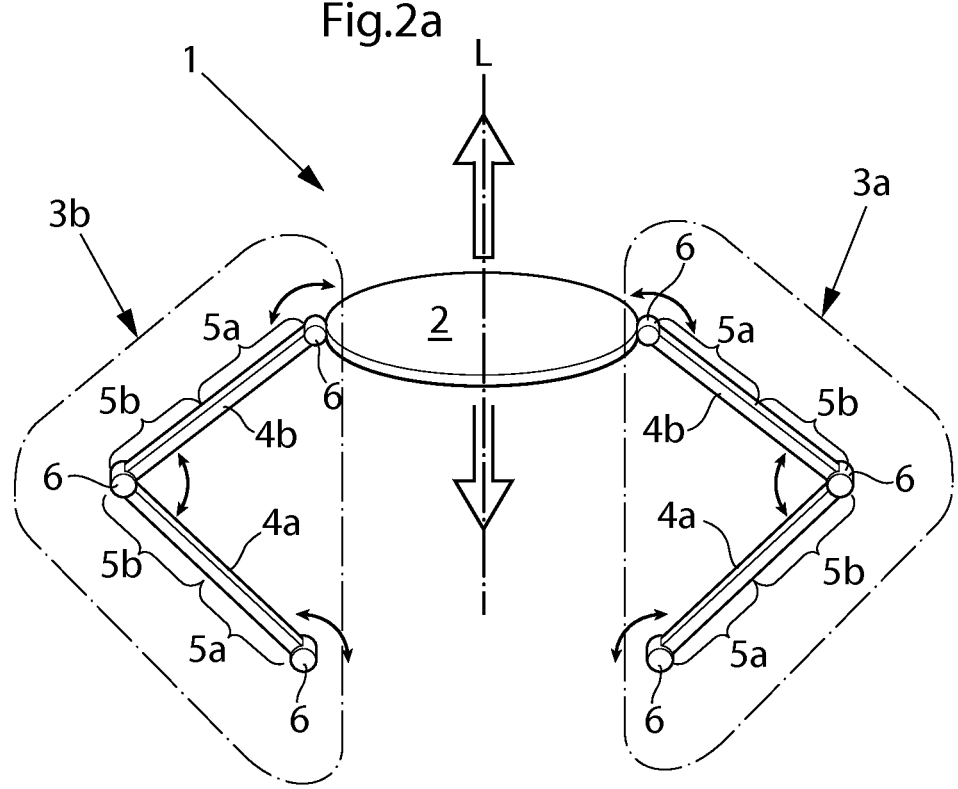
FIG. 2a shows a diaphragm device according to another embodiment, comprising two operation devices.

FIG. 2a shows a diaphragm device 1 according to an embodiment in which the diaphragm device 1 comprises a diaphragm 2 adapted to cover an orifice. The orifice is preferably adapted for a flow of a fluid, such as air or any other gaseous fluid, or water, or any other liquid fluid. The diaphragm device further comprises two operation devices, a first operation device 3a and a second operation device 3b. The first 3a and second 3b operation devices each comprises a first 4a and a second 4b operation organ which in turn each comprises a first portion 5a, placed in proximity to an orifice center axis L, and a second portion 5b, placed further away from the orifice center axis L than the first portion 5a. According to the embodiment shown in FIG. 2a, the first portions 5a of the first operation organs 4a of the first and second operation devices are adapted to be connected to a check valve housing (shown in FIGS. 6-10). The connection is according to the embodiment shown in FIG. 2a a movable connection which is movable by means of joints 6 adapted to perform rotational movement, such as hinges, around a joint axis. The second portions 5b of the first operation organs 4a of the first 3a and second 3b operation devices, are connected to the second portions 5b of the second operation organs 4b, these connections are also movable by means of joints 6 adapted to perform rotational movement. Furthermore, the first portions 5a of the second operation organs 4b of the first and second operation devices, are connected to the diaphragm 2, yet again by means of movable joints, and the second portions 5b of the second operation organs 4b of the first 3a and second 3b operation devices, are in analogy connected to the second portions 5b of the first operation organs 4a. The first operation organs 4a are thereby movable in relation to the second operation organs 4b and the second operation organs 4b are movable in relation to the diaphragm 2. The operation organs 4a, 4b, being part of the operation devices 3a, 3b, enables movement of the diaphragm 2, substantially along the length axis of the orifice (shown in FIGS. 6 and 7).

Figure 2B:
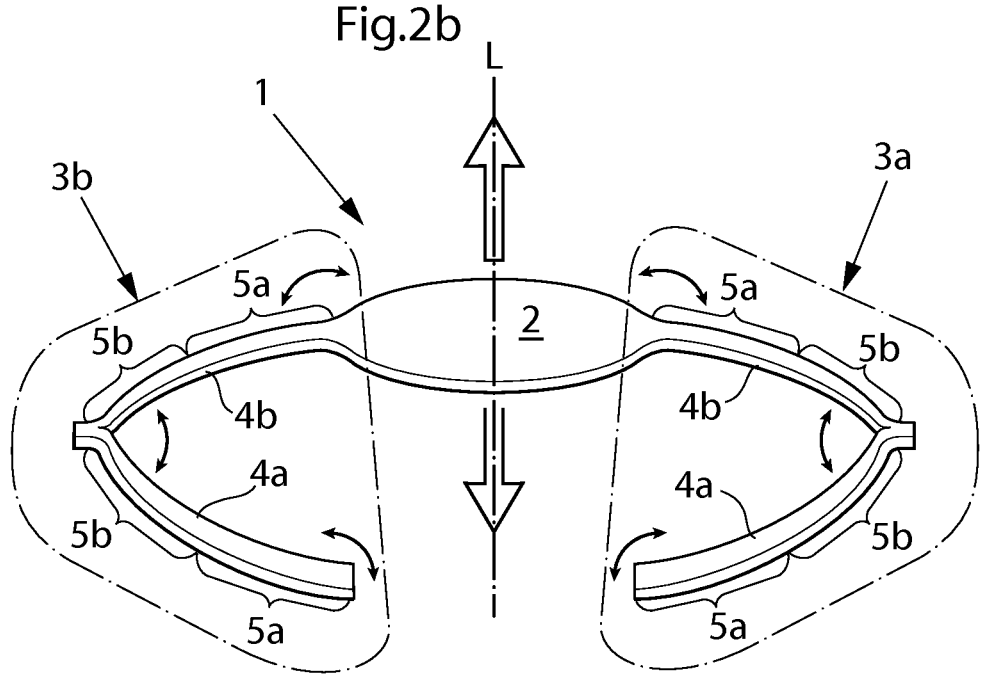
FIG. 2b shows a diaphragm device according to another embodiment, comprising two operation device.

FIG. 2b shows a diaphragm device 1 according to an embodiment in which the diaphragm device 1 comprises a diaphragm 2 adapted to cover an orifice. The orifice is preferably adapted for a flow of a fluid, such as air or any other gaseous fluid, or water, or any other liquid fluid. The diaphragm device further comprises two operation devices, a first operation device 3a and a second operation device 3b. The first 3a and second 3b operation devices each comprises a first 4a and a second 4b operation organ which according to the embodiment shown in FIG. 2b are resilient shafts which could be elastic or flexible in any other way. The first 4a and second 4b operation organs each comprises first portions 5a, placed in proximity to an orifice center axis L, and second portions 5b, placed further away from the orifice center axis L than the first portions 5a. According to the embodiment shown in FIG. 2b, the first portions 5a of the first operation organs 4a of the first 3a and second 3b operation devices are adapted to be connected to a check valve housing (shown in FIGS. 6-10). The connection to the check valve housing could be achieved through a mechanical fastening element, an adhesive or the central portion 5a extending to a fixation section made from the same material, as described in further detail with reference to FIGS. 4-5. The second portions 5b of the first operation organs 4a are according to the embodiment of FIG. 2b connected to the second portions 5b of the second operation organs 4b. According to this embodiment the connections are achieved through that the first operation organs 4a and the second operations 4b are made from the same work pieces and is thereby materially connected at a second portion of the operation organs 4a, b. The first portions 5a of the second operation organs 4b are connected to the diaphragm 2. According to the embodiment shown in FIG. 2b the connections are achieved through that the second operation organs 4b and the diaphragm 2 are made from the same work pieces and thereby materially connected. The second portions 5b of the second operation organs 4b are in analogy connected to the second portions 5b of the first operation organs 4a. The first operation organs 4a are thereby movable in relation to the second operation organs 4b and the second operation organs 4b are movable in relation to the diaphragm 2. The operation organs 4a, 4b, being part of the operation devices 3a, 3b enables movement of the diaphragm 2, substantially along the length axis of the orifice (shown in FIGS. 6 and 7).

Figure 3A:
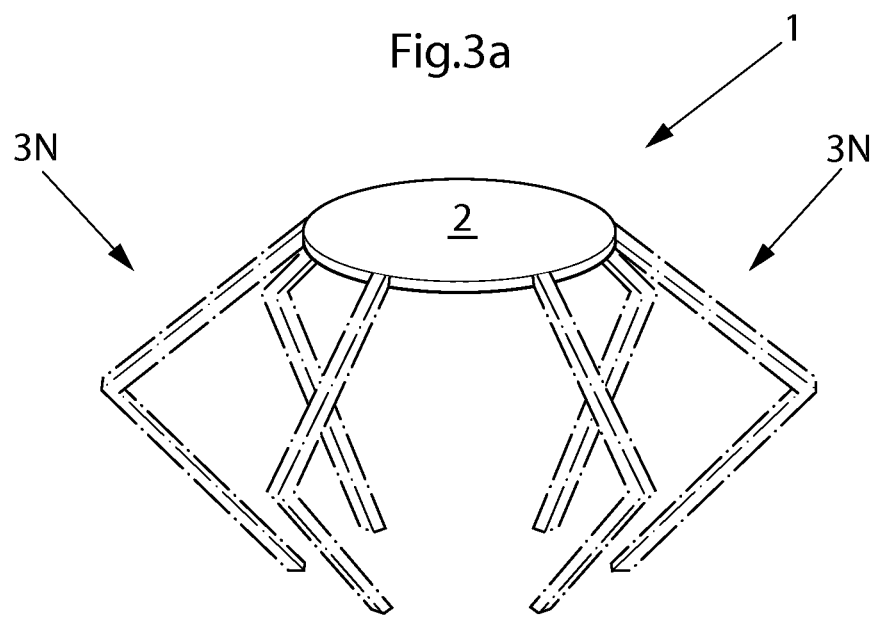
FIG. 3a shows a diaphragm device according to another embodiment, comprising a multiplicity of operation devices.

FIG. 3a shows the diaphragm device 1, comprising a diaphragm 2, being a diaphragm 2 according to any of the embodiments herein, and a multiplicity of operation devices 3N, according to any of the embodiments herein, adapted to enable movement of the diaphragm 2 substantially along a length axis of the orifice (shown in FIGS. 6 and 7), connected thereto.

Figure 3B:
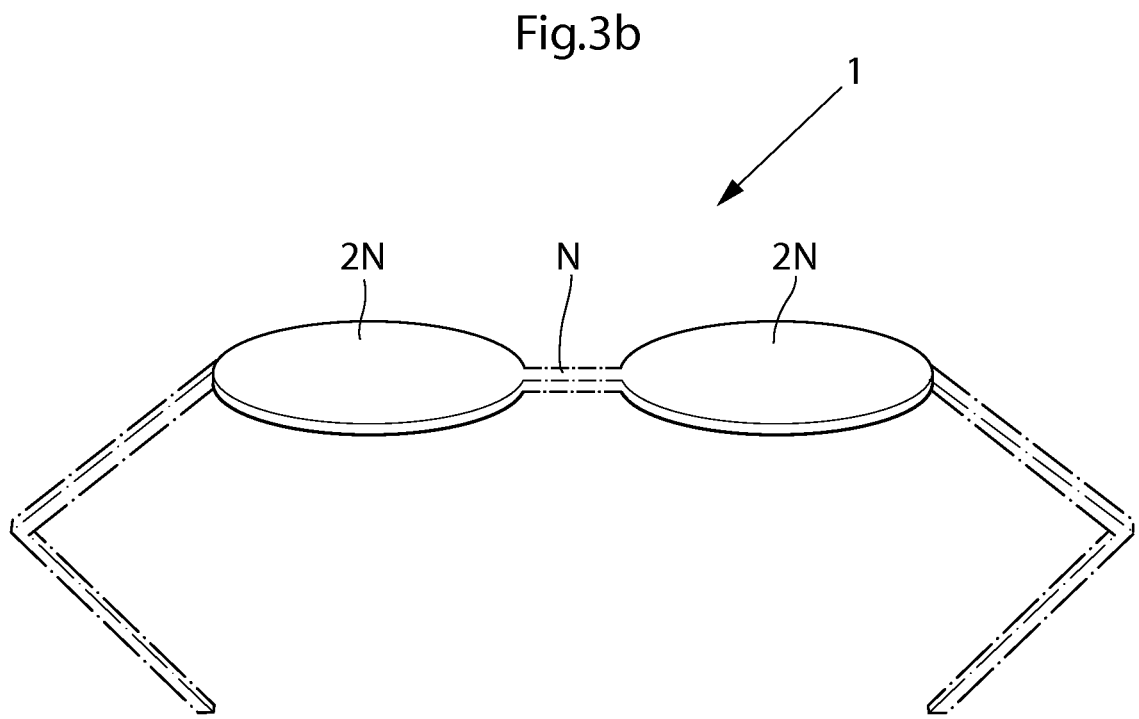
FIG. 3b shows a diaphragm device according to another embodiment, comprising a multiplicity of diaphragms.

FIG. 3b shows the diaphragm device 1, according to an embodiment in which the diaphragm device 1 comprises a multiplicity N of diaphragms 2N, being diaphragms 2N according to any of the embodiments herein. The multiplicity N of diaphragms 2N are adapted to cover a multiplicity of orifices (as shown in FIGS. 6-10).

Figure 4A:
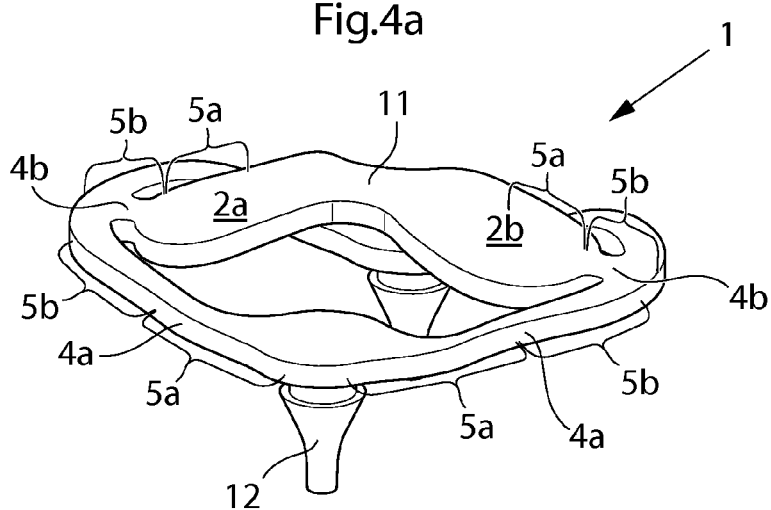
FIG. 4a shows the diaphragm device in perspective, in an open state.

FIG. 4a shows a diaphragm device 1, according to an embodiment in which the diaphragm device comprises two diaphragms 2a, 2b adapted to cover two orifices. The diaphragms 2a, 2b are interconnected by an interconnecting section 11 which according to this embodiment is made from the same work piece as the diaphragms 2a, 2b. The diaphragms 2a, 2b are in turn connected to second operation organs 4b, which are in turn connected to first operation organs 4a. The first and second operation organs each comprise first 5a and second portions 5b. The first portions of the second operation organs 4b are connected to the diaphragms 2a, 2b by means of the diaphragms 2a, 2b being made from the same work piece as the operation organs 4a, 4b. The second portions 5b of the second operation organs 4b are connected to the second portions 5b of the first operation organs 4a by means of the first and second operation organs 4a, 4b being made from the same work piece, and thereby materially connected. The first portions 5a of the first operation organs 4a are materially connected to each other and made from the same work piece. In the portion where the first portions 5a connected, the first portions 5a are connected to a fixation section 12 which is adapted to be placed in a hole for connecting the diaphragm device 1 to a check valve housing, (shown in FIGS. 8 and 9). The fixating sections 12 are according to this embodiment materially connected to the rest of the diaphragm device and made from the same work piece. The diaphragm device in FIG. 4a is shown in the state in which the check valve, in which the diaphragm device 1 is adapted to operate, is open. The design as shown in FIG. 4a creates a long extension of resilient material in the operation organs 4a, 4b, which enables the check valve to open a relatively long way by means of a relatively low pressure or flow. At the same time the deformation of the resilient material is relatively small since it is deformed in a multiplicity of points and along a relatively long extension of resilient material.

Figure 4B:
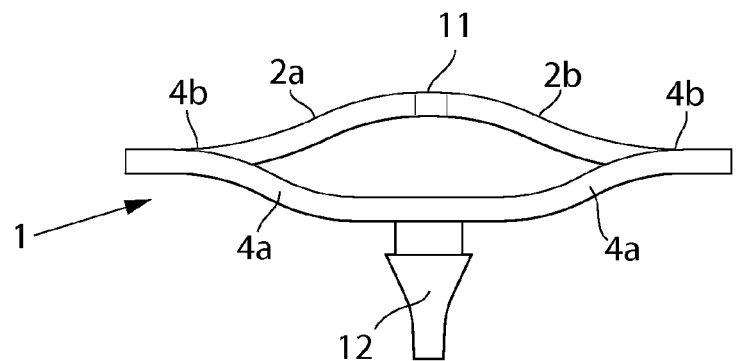
FIG. 4b shows the diaphragm device in a side view, in an open state.

FIG. 4b shows the diaphragm device 1 according to the embodiment described with reference to FIG. 4a in a side view. The diaphragm device in FIG. 4b is shown in the state in which the check valve, in which the diaphragm device 1 is adapted to operate, is open.

Figure 4C:
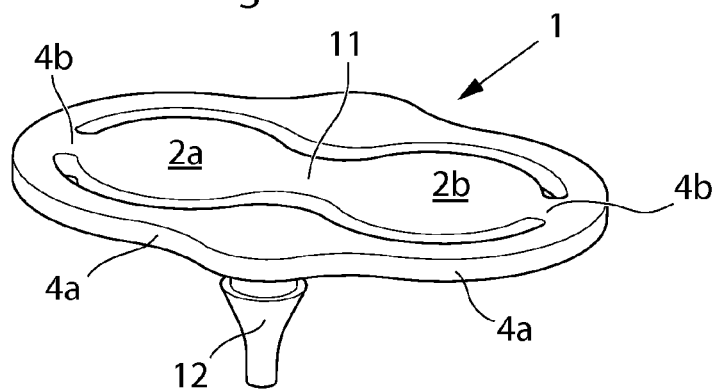
FIG. 4c shows the diaphragm device in perspective, in a closed state.

FIG. 4c shows the diaphragm device 1 according to the embodiment described with reference to FIGS. 4a and 4b, in a perspective top view. The diaphragm device in FIG. 4c is shown in the state in which the check valve, in which the diaphragm device 1 is adapted to operate, is closed.

Figure 4D:
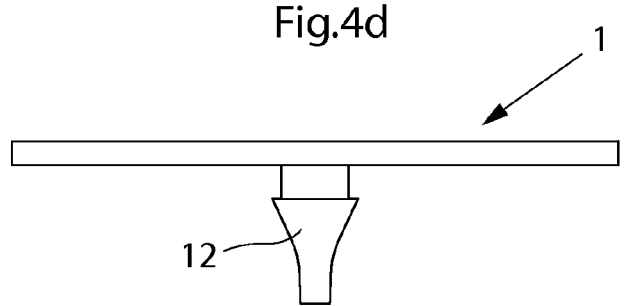
FIG. 4d shows the diaphragm device in a side view, in a closed state.

FIG. 4d shows the diaphragm device 1 according to the embodiment described with reference to FIGS. 4a, 4b and 4c, in a side view. The diaphragm device in FIG. 4d is shown in the state in which the check valve, in which the diaphragm device 1 is adapted to operate, is closed.

Figure 5A:
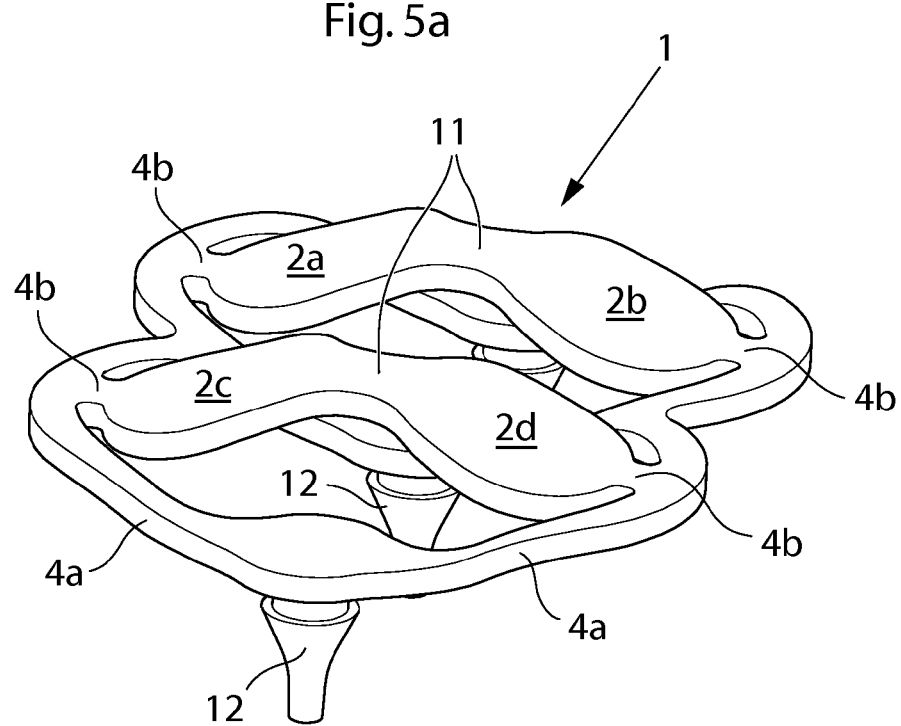
FIG. 5a shows the diaphragm device in perspective according to an embodiment in which the device comprises four diaphragms, in an open state.

FIG. 5a shows the diaphragm device 1 according to an embodiment in which the diaphragm device 1 comprises two diaphragm devices as described previously with reference to FIGS. 4a-d. The two sections of the diaphragm devices are materially connected through the central operation organs being materially connected and made from the same work piece. The central operation organs comprises one fixation section 12, and thus the entire diaphragm device 2 comprises three fixating sections 12 being materially connected and made from the same work piece as the rest of the diaphragm device 1. The diaphragm device 1 according to FIG. 5a shows the diaphragm device 1 being adapted to cover four orifices, as shown in FIGS. 6-10. The diaphragm device 1 in FIG. 5a is shown in the state in which the check valve, in which the diaphragm device 1 is adapted to operate, is opened.

Figure 5B:
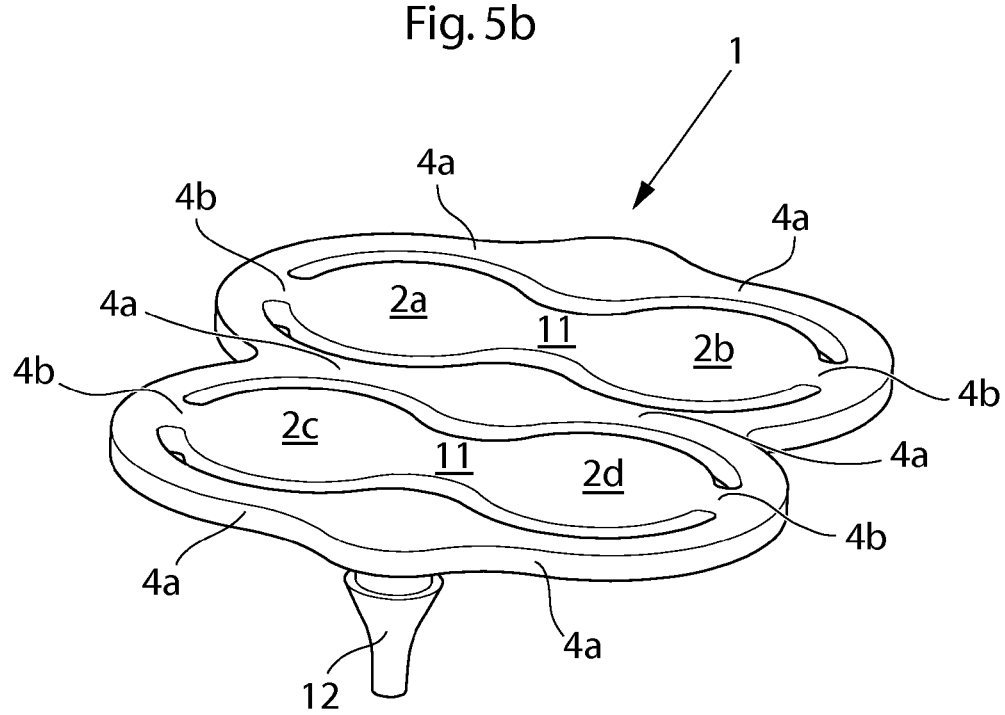
FIG. 5b shows the diaphragm device in perspective according to an embodiment in which the device comprises four diaphragms, in a closed state.

FIG. 5b shows the diaphragm device 1 according to the embodiment described with reference to FIG. 5a in a perspective top view. The diaphragm device 1 in FIG. 5b is shown in the state in which the check valve, in which the diaphragm device 1 is adapted to operate, is closed.

Figure 6:
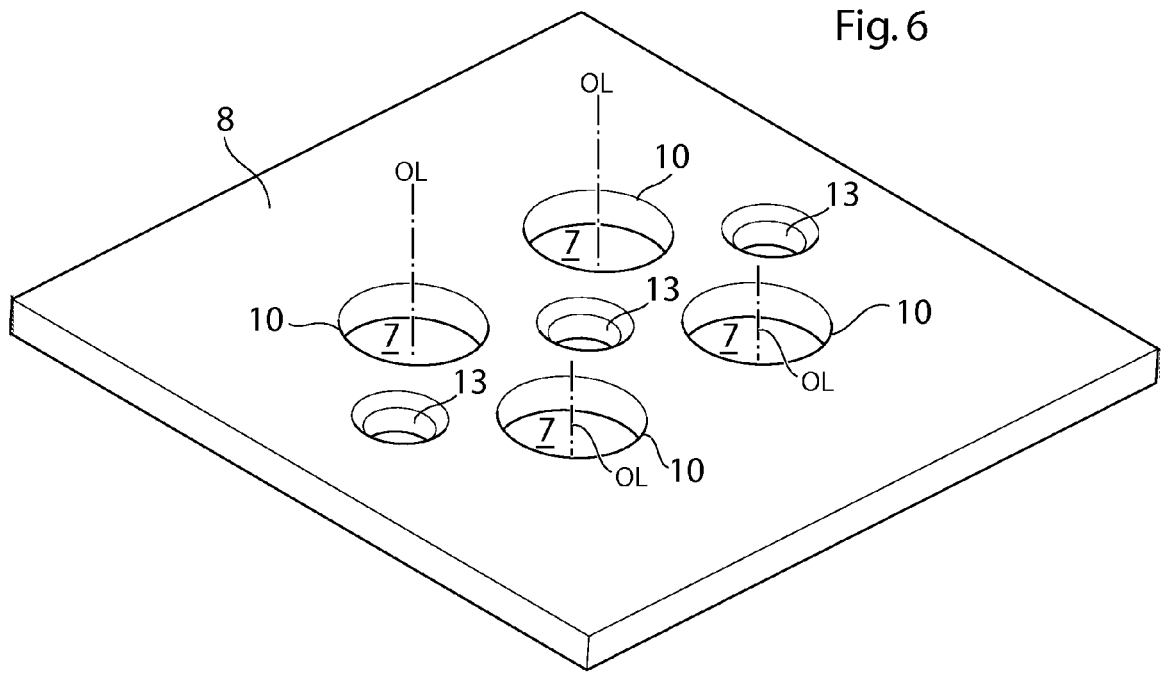
FIG. 6 shows a check valve housing according to an embodiment in which the check valve housing comprises four orifices.

FIG. 6 shows a check valve housing 8 to which the diaphragm devices according to the different embodiments described herein is adapted to be fixated. According to the specific embodiment shown, the check valve housing comprises four orifices 7 which are adapted to be covered by diaphragms for creating a sealing check valve. The orifices 7 are surrounded by a valve seat section 10 against which the diaphragm should rest when the check valve is in its closed state, and thereby create a sealing. The check valve housing 8 further comprises three holes 13 adapted to receive the fixating sections according to the embodiments described above, for fixating the diaphragm device to the check valve housing 8 and thereby creating a functioning and sealing check valve. An orifice length axis OL extends through the center of the orifices 7, along the extension of the orifice, perpendicular to the orifice center axis previously described, and constitutes the primary direction of movement for the diaphragm adapted to cover the orifice 7. The embodiment shown in FIG. 6 displays four orifices 7, therefore the diaphragm device described with reference to FIGS. 5a and 5b is suitable for this specific check valve housing 8. However, the design principle of the check valve housing should be seen as adaptable for the desired amount of orifices and corresponding amount of diaphragms.

Figure 7:
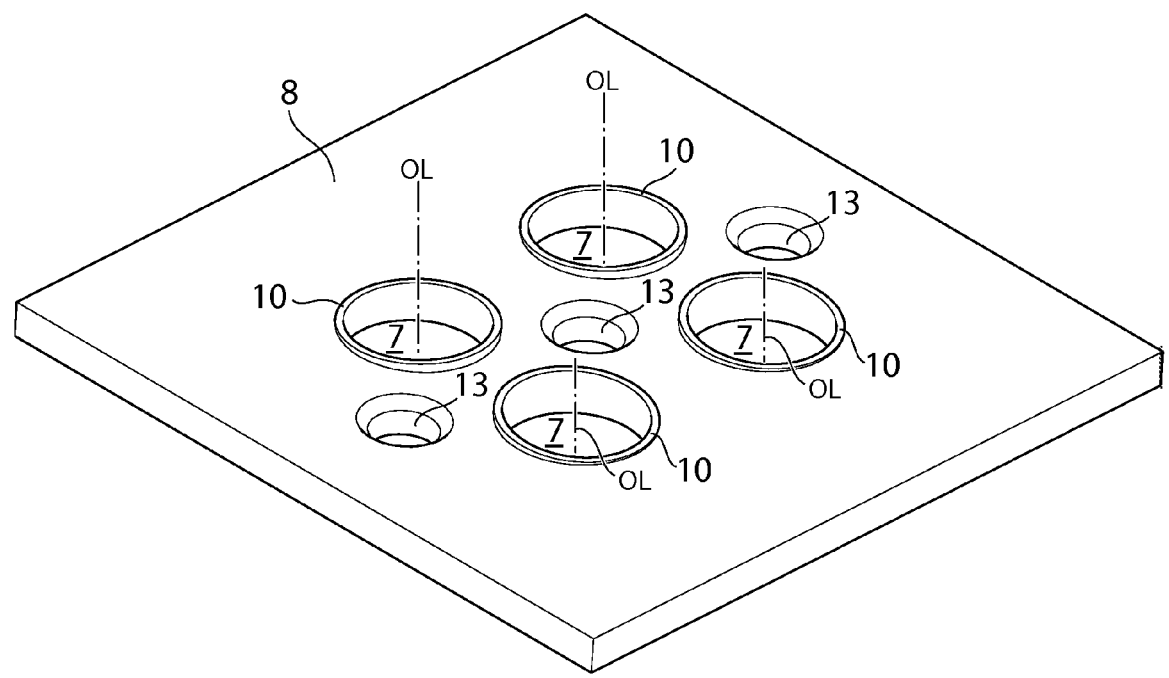
FIG. 7 shows a check valve housing according to another embodiment in which the check valve housing comprises four orifices.

FIG. 7 shows a check valve housing 8 similar to the check valve housing described with reference to FIG. 6, however, the check valve housing shown in FIG. 7 comprises indented valve seats 10 which in some applications create a better sealing together with a diaphragm. The indented valve seats according to the specific embodiment shown in FIG. 7 are angled such that the indentations are higher towards the central part of the check valve housing 8, which in some applications create a better sealing together with the diaphragms according to any of the embodiments since the diaphragms according to some embodiments are connected with an interconnecting part (as shown in FIGS. 4-5) adapted to be flexible and thereby might not create a perfect plane. The indented valve seats 10 also leads to a small prestress which further assists in creating the sealing between the diaphragm 2a, 2b, 2c, 2d and the valve seat 10.

According to the embodiments depicted in the figures the orifices are circular, however it is equally conceivable that the orifices have a polygon shape or an oval shape, it is furthermore conceivable that several orifices are interconnected and that the diaphragms in those embodiment are shaped so as to together cover the orifice or orifices. In analogy to the orifices, it is conceivable that the diaphragms have a different shape than the oval or circular shape shown with reference to the appended drawings. In other words, the orifices could be adapted for the design of the check valve, the need for a flow through the orifices and the fluid adapted to be used in the check valve.

Figure 8:
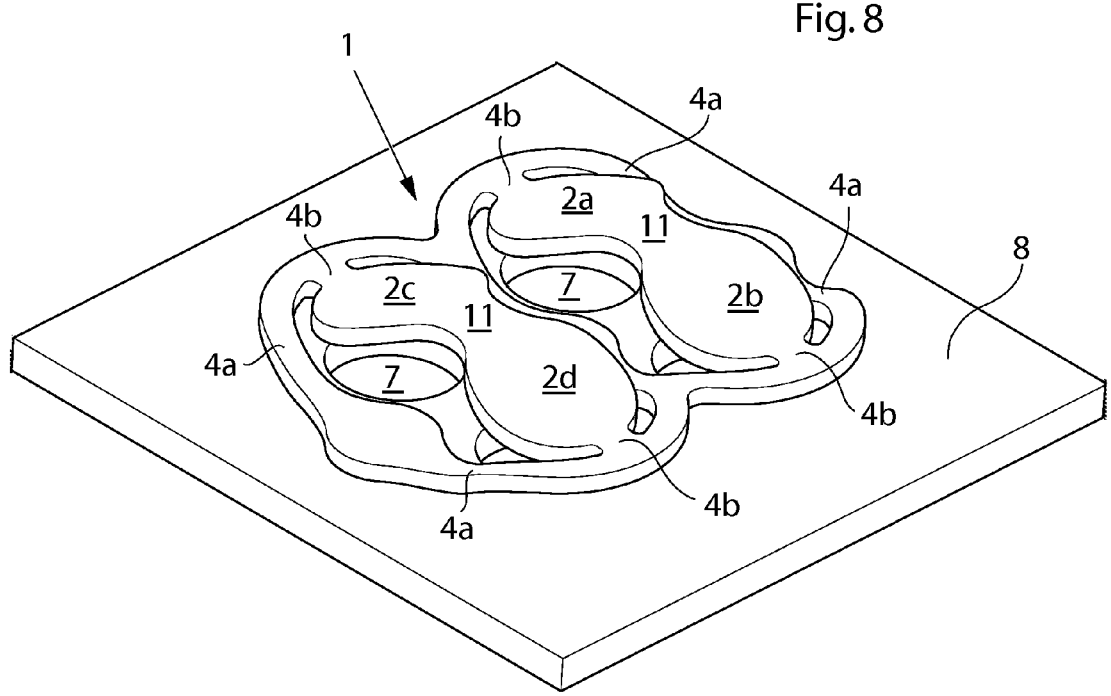
FIG. 8 shows a check valve according to one embodiment, in perspective.

FIG. 8 shows a check valve comprising diaphragm device 1 and a check valve housing 8. The diaphragm device is a diaphragm device according to the embodiment described with reference to FIG. 5a, comprising four diaphragms 2a, 2b, 2c, 2d, adapted to cover four orifices 7. The check valve further comprises an operation device adapted to enable movement of the diaphragms 2a, 2b, 2c, 2d substantially along a length axis of the orifices 7, as shown in FIGS. 6 and 7. The operation devices comprise first operation organs 4a, and second operation organs. The first operation organs 4a are movable in relation to the second operation organs 4b, and the second operation organs 4b are movable in relation to the diaphragms 2a, 2b, 2c, 2d, for enabling movement of the diaphragms 2a, 2b, 2c, 2d, substantially along the length axis of the orifices 7. In its open state, as shown in FIG. 8 the diaphragms 2a, 2b, 2c, 2d are slightly angled, which results in a small pressure drop of the passing fluid, since the fluid does not encounter a flat surface. The pressure drop is even lower in the embodiment shown in FIG. 8, since the diaphragms 2a, 2b, 2c, 2d are round, which allows the air to pass the valve without making any sharp turns.

Figure 9:
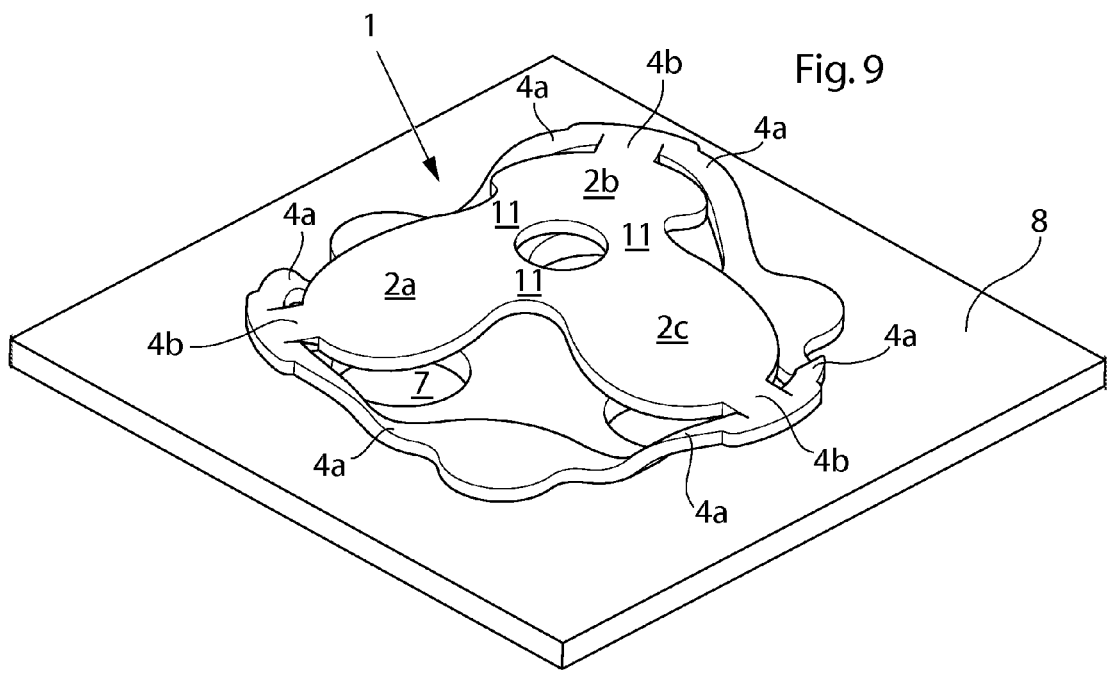
FIG. 9 shows a check valve according to another embodiment, in perspective.

FIG. 9 shows a check valve according to an embodiment in which the check valve housing 8 comprises three orifices 7 adapted for a fluid flow. The orifices 7 are adapted to be covered by a diaphragm device 1 based on the principle described herein. The diaphragm device according to the embodiments of FIG. 9 comprises three diaphragms 2a, 2b, 2c, each diaphragm adapted to cover one of the orifices 7. The diaphragms are connected centrally in the check valve construction through connecting sections 11 being more narrow and thereby more elastic or resilient for enabling the movement of the diaphragms 2a, 2b, 2c in relation to each other. The diaphragms id furthermore connected to operation devices in the peripheral portions of the diaphragms, the operation device comprising operation organs 4a, 4b, being elastic or resilient and thereby enabling movement of the diaphragms 2a, 2b, 2c, substantially along length axis of the orifices 7. One advantage with the check valve comprising multiple orifices 7 is that the pressure needing to impact the diaphragms 2a, 2b, 2c, 2d could be much lower and thus the valve does not need to cope with a large pressure which means that the valve can be made from e thinner material, which thus leads to a lighter overall structure.

The first and second operation organ could according to any of the embodiments herein be made from the same resilient material. It is also conceivable the entire diaphragm device, according to any of the embodiments, is made from the same resilient material. The first and second operation organ and/or the diaphragm can in thus be adapted to be movable in relation to each other by means of the shape of the resilient material in combination with the elastic or flexible properties of said resilient material.

The check valve and parts thereof according to any of the embodiment could comprise a material adapted for the application for which the check valve is to be used, considering parameters such as weight, heat resistance, chemical resistance, permeability, durability, pressure, radiation, flow speeds, flow amounts and/or appearance. According to some embodiments the diaphragms and/or the rest of the diaphragm device could comprise a silicone material a polyurethane material, EPDM, Chlorosulfonated polyethylene (CSM, (Hypalon®)), or a synthetic rubber copolymer such as NBR, fluorinated elastomers, such as FKM FFKM and FEPM, polytetrafluoroethylene (PTFE), perfluoroalkoxy (PFA) and fluorinated ethylene propylene (FEP), FPM (Viton®), CR (Neoprene®), Butyl rubber (IIR), or natural rubber (NR). It is furthermore conceivable that parts of the diaphragm device is made from a different material or the same material with different treatments, furthermore parts of the diaphragm device could be reinforced, for examples with fibers, for example for better strain endurance. This is supposed to be seen as examples of conceivable materials not in any way limiting the scope of the invention.

The housing and/or the valve seat preferably comprises a less elastic polymer material such as cross-linked polyethylene or gas sterilized polyethylene, poly vinyl chloride (PVC such as U-PVC or C-PVC), poly propylene (PP), Fiberglas armed poly propylene (PPG), polyvinylidene fluoride (PVDF), Polyethylene (PE) such as UHMW-PE, Ethylene tetrafluoroethylene (ETFE), Poly styrene (PS) or a fluorinated polymer such as polytetrafluoroethylene (PTFE), perfluoroalkoxy (PFA) and fluorinated ethylene propylene (FEP). It is further conceivable that the material in the housing is a metal or metal alloy, or a ceramic material. Analogous to the above stated this is also to be seen as examples of conceivable materials, not in any way limiting the scope of the invention.

Figure 10A:
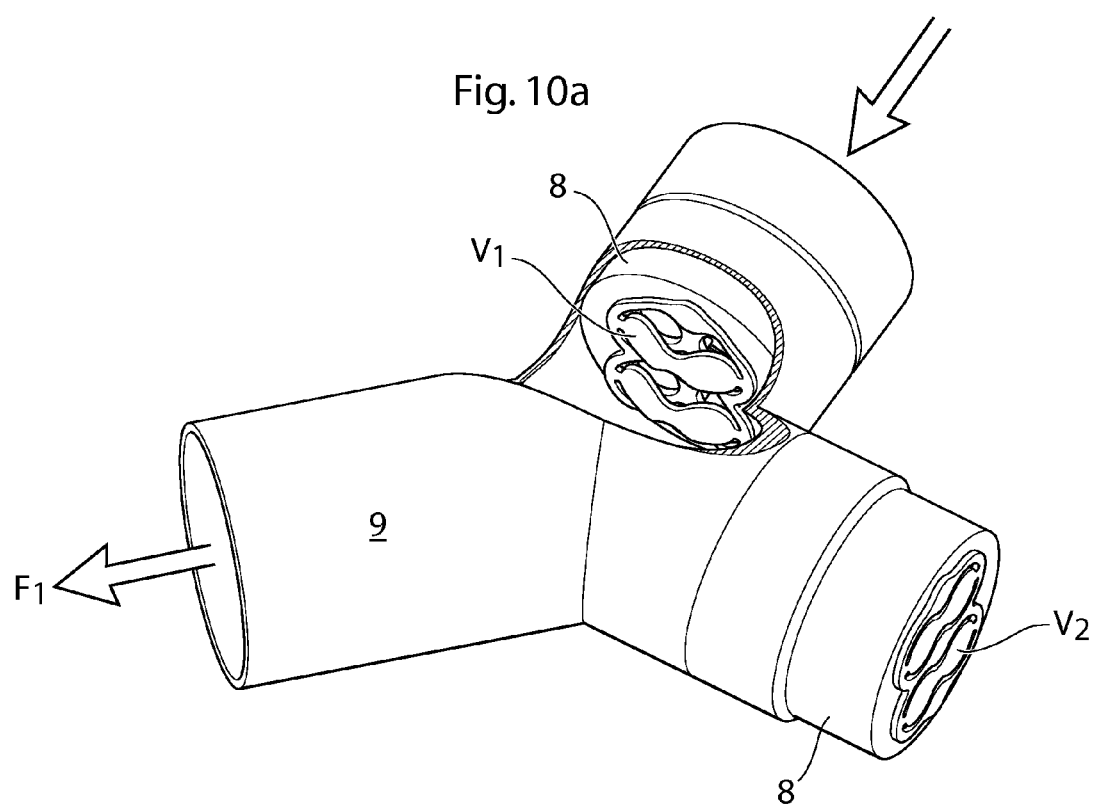
FIG. 10a shows a check valve system according to one embodiment, in a first state.
Figure 10B:
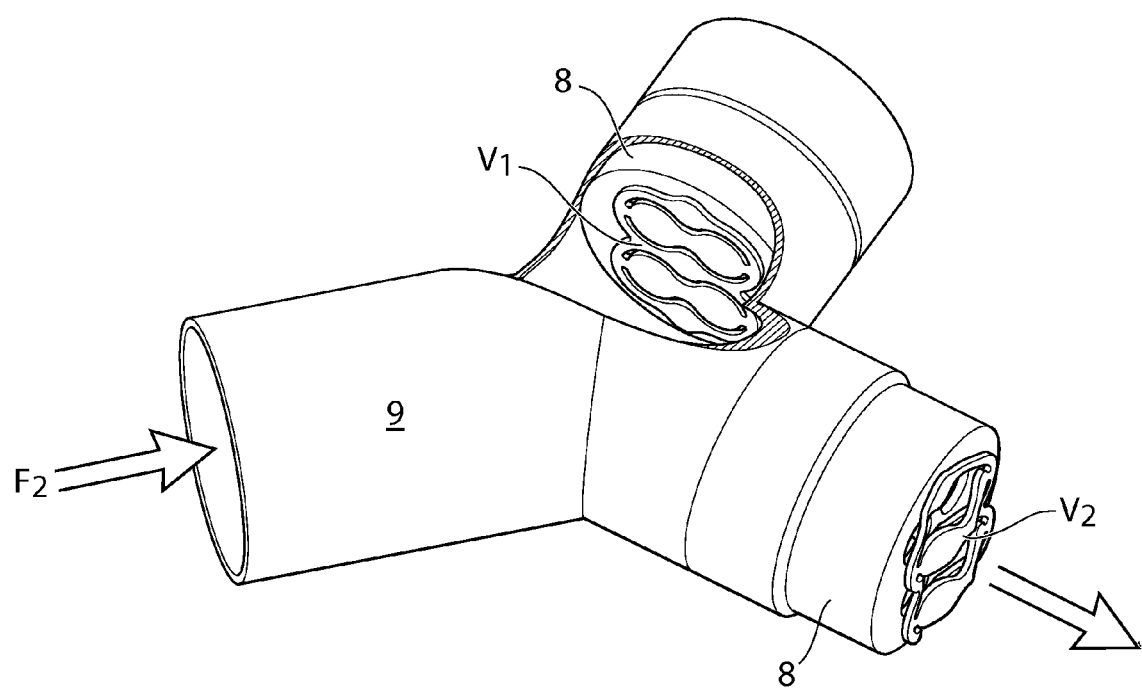
FIG. 10b shows a check valve system according to one embodiment, in a second state.

FIGS. 10a and 10b shows a check valve system comprising two check valves according to the embodiments described with reference to FIG. 8. The check valve system comprises a flow channel 9 adapted to have a flow F1. The flow channel 9 could be a pipe or tube which could be a part of the check valve housing 8 or part of a pump housing in fluid connection with a check valve according to any of the embodiments above. A first check valve V1 according to the embodiment described with reference to FIG. 8 is positioned in a part of the flow channel 9. The first check valve is adapted to be opened during flow F1 in the flow channel 9 in a first direction, and adapted to be closed during flow F2 in the flow channel 9 in a second direction, as shown in FIG. 10b. The check valve system further comprises a second check valve V2 adapted to be opened during flow F2 in the flow channel 9 in a second direction, as shown in FIG. 10b. The second check valve is thereby adapted to be closed during flow in the flow channel in a first direction F1, as shown in FIG. 10a. The check valve housing 8 could be a member adapted to be inserted into the flow channel 9, however it is also conceivable that the check valve housing 8 is a part of the flow channel 9, materially connected to the flow channel 9 and made from the same work piece as the flow channel 9.

Please note that in the detailed description above any embodiment or feature of an embodiment could be combined in any way if such combination is not clearly contradictory.

The invention claimed is:

1. A diaphragm device for a check valve, said diaphragm device comprising:
   a. a first diaphragm, adapted to cover a first orifice,
   b. a second diaphragm, adapted to cover a second orifice adjacent the first orifice, the first and second orifices having parallel length axes,
   c. a resilient interconnecting section having a first end connected to the first diaphragm and a second end connected to the second diaphragm so as to interconnect the diaphragms,
   d. a first and second operation devices, each connected to a respective one of said diaphragms and adapted to enable movement of said diaphragm substantially along a length axis of said orifice, each of said operation devices comprising at least one first operation organ, and at least one second operation organ, wherein:
      i. said first operation organ comprises a first portion and a second portion, and
      ii. said second operation organ comprises a first portion and a second portion,
   wherein:
   for each operation device, said first portion of said first operation organ is adapted to be connected to a check valve housing, and said second portion of said first operation organ is connected to said second portion of said second operation organ, and wherein said first portion of said second operation organ is connected to the respective one of the diaphragms, and said second portion of said second operation organ is connected to said second portion of said first operation organ,
   for each operation device, said first operation organ is movable in relation to said second operation organ and said second operation organ is movable in relation to the respective one of the diaphragms, for enabling movement of said diaphragm substantially along said length axis of said orifice, and
   said diaphragms comprise resilient material such that each diaphragm is angled in relation to said length axis of said respective orifice and opposingly angled in relation to the other of the diaphragms when the diaphragms are operated by said first and second operation devices and, for each diaphragm, the angle resulting in a portion of the diaphragm connected to the interconnecting section being spaced further from the respective orifice than a portion of the diaphragm connected to the respective operation device and resulting in a low pressure drop of fluid passing said diaphragm; and
   wherein each diaphragm is wider than the interconnecting section.

2. The diaphragm device according to claim 1, wherein said first portions are central portions placed in proximity to an orifice center axis, and said second portions are peripheral portions placed further away from said orifice center axis than said central portions.

3. The diaphragm device according to claim 1, wherein each of said diaphragms comprises said respective operation device.

4. The diaphragm device according to claim 1, further comprising a fixating section adapted to fixate said diaphragm device to said check valve housing, wherein said fixating section is materially connected to said diaphragm device.

5. The diaphragm device according to claim 1, wherein said at least one operation device comprises resilient material, and wherein said operation device enables movement of said respective diaphragm by said operation device comprising said resilient material.

6. The diaphragm device according to claim 1, wherein said diaphragm device further comprises at least a third diaphragm adapted to cover a third orifice.

7. The diaphragm device according to claim 1, wherein said diaphragm device further comprises at least a third operation device.

8. The diaphragm device according to claim 1, wherein said resilient material is a resilient polymer material.

9. A check valve comprising:
   a. a diaphragm device comprising:
      i. a first diaphragm, adapted to cover a first orifice,
      ii. a second diaphragm, adapted to cover a second orifice adjacent the first orifice, the first and second orifices having parallel length axes,
      iii. a resilient interconnecting section having a first end connected to the first diaphragm and a second end connected to the second diaphragm so as to interconnect the diaphragms,
      iv. a first and second operation devices, each connected to a respective one of said diaphragms and adapted to enable movement of said diaphragm substantially along a length axis of said orifice, each of said first and second operation devices comprising at least one first operation organ, and at least one second operation organ, wherein:
      said first operation organ comprises a first portion, and a second portion, and
      said second operation organ comprises a first portion, and a second portion, wherein:
         a. for each operation device, said first portion of said first operation organ is adapted to be connected to a check valve housing, and said second portion of said first operation organ is connected to said second portion of said second operation organ,
         b. for each operation device, said first portion of said second operation organ is connected to the respective one of the diaphragms, and said second portion of said second operation organ is connected to said second portion of said first operation organ, and
         c. for each operation device, said first operation organ is movable in relation to said second operation organ and said second operation organ is movable in relation to the respective one of the diaphragms, for enabling movement of said diaphragm substantially along said length axis of said orifice, and
   b. a valve seat surrounding each of said orifices, wherein said diaphragms seal against said valve seats while covering said orifices, and
   c. a check valve housing comprising said valve seat; and
   wherein said diaphragms comprise resilient material such that each diaphragm is slightly angled in relation to said length axis of said respective orifice and opposingly angled in relation to the other of the diaphragms when the diaphragms are operated by said first and second operation devices and, for each diaphragm, the angle resulting in a portion of the diaphragm connected to the interconnecting section being spaced further from the respective orifice than a portion of the diaphragm connected to the respective operation device and resulting in a low pressure drop of fluid passing said diaphragm; and
   wherein each diaphragm is wider than the interconnecting section.

10. A check valve system comprising;
a. a flow channel,
b. a first check valve according to claim 9,
c. a second check valve according to claim 9, wherein;
   i. said first check valve is adapted to be opened during flow in said flow channel in a first direction, and said first check valve is adapted to be closed during flow in said flow channel in a second direction, and
   ii. said second check valve is adapted to be opened during flow in said flow channel in the second direction, and said second check valve is adapted to be closed during flow in said flow channel in the first direction.

11. The check valve system according to claim 10, wherein said second flow is a flow in a direction substantially opposite to said first flow.

12. The check valve system according to claim 10, wherein said flow channel comprises said valve housing.

\* \* \* \* \*